US011155252B2

(12) United States Patent
Gherardi et al.

(10) Patent No.: US 11,155,252 B2
(45) Date of Patent: Oct. 26, 2021

(54) BRAKING SYSTEM VALVE ASSEMBLY AND BRAKE CALIPER BODY WITH SAID ASSEMBLY

(71) Applicant: FRENI BREMBO S.P.A., Curno (IT)

(72) Inventors: Pierangelo Gherardi, Curno (IT); Mauro Ursic, Curno (IT)

(73) Assignee: Freni Brembo S.p.A., Curno Bergamo (IT)

( * ) Notice: Subject to any disclaimer, the term of this patent is extended or adjusted under 35 U.S.C. 154(b) by 84 days.

(21) Appl. No.: 16/492,674

(22) PCT Filed: Mar. 6, 2018

(86) PCT No.: PCT/IB2018/051420

§ 371 (c)(1),
(2) Date: Sep. 10, 2019

(87) PCT Pub. No.: WO2018/163054

PCT Pub. Date: Sep. 13, 2018

(65) Prior Publication Data

US 2020/0047732 A1 Feb. 13, 2020

(30) Foreign Application Priority Data

Mar. 10, 2017 (IT) ........................ 102017000026909

(51) Int. Cl.
*B60T 13/68* (2006.01)
*B60T 8/34* (2006.01)
(Continued)

(52) U.S. Cl.
CPC .............. *B60T 13/68* (2013.01); *B60T 8/341* (2013.01); *B60T 8/885* (2013.01); *B60T 13/662* (2013.01); *B60T 17/02* (2013.01); *F16K 15/028* (2013.01)

(58) Field of Classification Search
CPC ...... F16K 15/028; F16K 15/026; B60T 13/68; B60T 8/341; B60T 8/885; B60T 13/662; B60T 17/02
(Continued)

(56) References Cited

U.S. PATENT DOCUMENTS 2,216,622 A * 10/1940 Miller .................. F16K 15/028 137/515.3
2,727,531 A * 12/1955 Blackford ............ F16K 15/028 137/516.13
(Continued)

FOREIGN PATENT DOCUMENTS

DE 4035817 A1 5/1992
DE 19531468 A1 2/1997
(Continued)

OTHER PUBLICATIONS

European Patent Office, International Search Report with Written Opinion, issued in PCT/IB2018/051420, dated Apr. 24, 2018, 11 pages, European Patent Office, Rijswijk, Netherlands.

*Primary Examiner* — Melanie Torres Williams
(74) *Attorney, Agent, or Firm* — Marshall & Melhorn, LLC

(57) ABSTRACT

A valve assembly for a braking system having a master cylinder side opening, at least one caliper side opening, and at least one valve pipe, connecting the master cylinder side opening and the caliper side opening. A shutter element has a shutter body movable with respect to the valve body. When the shutter body is in a valve closing position, it interrupts a at least one main fluid passage and defines a master cylinder side pipe stretch facing a master cylinder side opening and a caliper side pipe stretch facing a caliper side opening in the valve pipe. The shutter body at least partially delimits at least one secondary fluid passage, so that, when the shutter body is in a valve closing position, the master
(Continued)

cylinder side pipe stretch is in fluid communication with the caliper side pipe stretch only through the secondary fluid passage.

17 Claims, 12 Drawing Sheets

(51) Int. Cl.
*B60T 8/88* (2006.01)
*B60T 13/66* (2006.01)
*B60T 17/02* (2006.01)
*F16K 15/02* (2006.01)

(58) Field of Classification Search
USPC .......................................................... 137/845
See application file for complete search history.

(56) References Cited

U.S. PATENT DOCUMENTS 4,936,334 A * 6/1990 Hendershot ............ B60T 8/341 137/112
5,141,025 A 8/1992 Eichhorn et al.
5,150,772 A * 9/1992 Pantale .................... B60T 8/26 188/72.4
5,333,945 A 8/1994 Volz et al.
5,370,450 A 12/1994 Volz et al.
5,401,085 A 3/1995 Burgdorf et al.
5,788,344 A 8/1998 Friedow et al.
6,196,364 B1 * 3/2001 Fouts ...................... B60T 11/30 137/614.19
6,398,317 B1 6/2002 Burgdorf et al.
6,668,856 B2 12/2003 Warlick
7,182,413 B2 2/2007 Starr et al.
7,201,455 B2 4/2007 Quirant et al.
7,296,594 B1 * 11/2007 Phanco ............... F16H 61/4017 137/512.2
8,403,428 B2 3/2013 Koyama
2013/0220462 A1 * 8/2013 Lareau .................. A61M 39/24 137/845
2017/0130640 A1 * 5/2017 Sato ...................... F16K 15/028

FOREIGN PATENT DOCUMENTS

DE 19721774 A1 11/1998
DE 19735309 A1 2/1999
DE 19849877 A1 9/1999
DE 19914516 A1 10/1999
DE 102005004465 A1 9/2005
EP 0464389 A1 1/1992
FR 2859436 A1 3/2005
WO WO/9218364 A1 10/1992
WO WO2004113139 A2 12/2004
WO WO-2020065604 A1 * 4/2020 ........... F16K 15/028

* cited by examiner

BRAKING SYSTEM VALVE ASSEMBLY AND BRAKE CALIPER BODY WITH SAID ASSEMBLY

FIELD OF THE INVENTION

The present invention relates to a valve assembly.

In particular, the present invention relates to a valve assembly for a braking system of a vehicle.

The present invention also relates to a caliper body for a braking system of a vehicle.

Background Art

In a disc brake, the brake caliper is generally arranged straddling the outer peripheral margin of a brake disc, adapted to rotate about a rotation axis. Brake calipers are constrained to a support structure which remains stationary with respect to the vehicle wheel, such as, for example, a spindle of a vehicle suspension, or a vehicle wheel hub, or a fork or swingarm of a motor vehicle. The brake caliper usually comprises a caliper body having two elongated portions arranged so as to face opposite braking surfaces of a brake disc, and at least one bridge, which connects said two elongated portions to each other.

In floating caliper bodies associated with fixed discs, a floating or sliding portion of the caliper body has one or more cylinders, adapted to accommodate hydraulic pistons capable of applying a thrust action on the facing friction pads, abutting against the braking surface of the disc, while it slides on the bracket, or fixed portion of the caliper, and acts on an opposite friction pad, abutting it against the brake disc to apply the braking action.

In fixed caliper bodies associated with fixed discs, one or more cylinders are present on both opposite sides of the caliper body, which cylinders are adapted to accommodate hydraulic pistons capable of applying a thrust action on the facing friction pad, abutting it against the braking surface of the disc, without needing to move the brake disc axially, abutting both opposite brake pads against the opposite braking surfaces of the brake disc to apply the braking action.

Otherwise, fixed caliper bodies associated with fixed discs are also known, in which only one of the elongated portions of the caliper body has one or more cylinders adapted to accommodate hydraulic pistons capable of applying a thrust action on the facing friction pad, abutting it against the braking surface of the disc, which in turn slides axially on its support and abuts against the opposite friction pad to apply the braking action.

The actuation of the hydraulic pistons of the caliper is controlled by the brake pedal or lever, which actuates a master cylinder adapted to press on the brake fluid present in the braking circuit, which transfers the pressure to one or more hydraulic pipes accommodated in the body of the brake caliper and adapted to press on the back of the brake pads mounted on the brake caliper. Valves are generally provided in the braking circuit, e.g. check valves, as well as control valves and solenoid valves controlled by an electronic control unit to activate the wheel anti-locking system (ABS) or to activate the assisted braking or vehicle stability systems.

Check valves are generally known comprising a movable ball shutter which, biased by the action of a spring, tends arrange itself in a position such as to occlude the passage channel of the valve. Solutions of this type are simple and cost-effective to be achieved but are not free from drawbacks. In particular, check valves of the type described above, when fitted in braking systems of a vehicle, precisely because it is in the form of a ball, the movable shutter tends to vibrate in its housing, e.g. in vehicle travel conditions, generating annoying noise while risking to prematurely damage the surfaces of the walls of its housing due to repeated shocks, thus requiring frequent maintenance.

For example, document EP-464389 discloses the manufacture of a support for the ball to prevent broad vibrational movements. For example, document US-2003-0127140 shows a solution of valve body having walls to prevent the displacement in radial direction of the ball in the housing pipe in which it is inserted. Although partially advantageous, such solutions have some disadvantages, because such types of check valves usually exhibit slower response times than the solenoid valves controlled by an electromagnetic actuator, e.g. a solenoid.

Furthermore, despite being able to provide sufficiently rapid response time for some applications, the aforesaid check valve types determine the formation of a pressure shock wave, also known as water hammer, when the movable ball shutter closes the passage channel of the valve because of the pressures in play in the braking circuit and the inertia of the brake fluid flow. Such a phenomenon, especially if it is particularly intense, may cause damage to the valve and to the pipes which form the braking circuit, e.g. the braking fluid interposed between the valve and the master cylinder, and in some cases cause the failure of some components.

Furthermore, in a disc brake, the pistons adapted to press against the back of the brake pads are usually associated with retraction devices, e.g. elastic seals, adapted to rapidly retract the piston into the cylinder, thus detaching it from the back of the brake pad at the end of the braking action and thus allowing the pad, biased in turn by a spring, to move away from the disc in order to prevent generating an undesired residual braking torque due to a continuous albeit minor friction of the pads on the braking band of the brake disc when the braking action ends. The retraction of the pistons determined by such retraction devices imposes a sudden re-closing of the valves provided in the braking circuit and this may form a water hammer in the circuit portion upstream of the valve, i.e. interposed between the valve and the master cylinder.

The need is therefore felt to provide a valve solution adapted to prevent, or at least strongly limit, the formation of water hammers in the hydraulic circuit in which it is fitted, both if overpressure is present in the brake circuit branch which connects the valve to the actuating lever or pedal of the brake, for example but not necessarily if the valve is of the electro-actuated type, and if an overpressure is present in the brake circuit branch which connects the valve to the brake caliper, for example but not only necessarily in the case of sudden rollback of the piston and elastic recovery of the deformation in the brake circuit which is pressurized during the braking action.

In particular the need is strongly felt to avoid, or strongly limit, the excessive overpressure in the hydraulic circuit which appears in a very dangerous manner especially in case of vibrations of the disc caused by the abrupt vibrations of the wheel, phenomenon known as wobble, e.g. but not only when the front wheel of a motor vehicle encounters a repeated series of humps on a bend. In this case, the front wheel oscillates abruptly, making the front fork vibrate about the frame support sleeve, causing the brake disc to vibrate, which brake disc ends up pressing, sometimes even abruptly, against the brake pads, in non-braking conditions of the braking system, thus causing their mutual abrupt retraction, and therefore an abrupt retraction of the piston.

For example, the document WO-2004-113139 shows a solenoid valve for a wheel anti-locking system in a braking system comprising an internally hollow fixed rod to delimit a feeding pipe of the brake fluid from the master cylinder, in which the fixed rod cooperates with a movable element fitted on a shutter to close the passage channel of the valve. In the walls of the fixed rod, communicating with the inner cavity of the fixed rod, there is a radial hole which is occluded in operating conditions by a resilient seal, so that when the brake fluid pressure downstream of the valve increases beyond a given threshold value, the seal moves from the position in which it closes the radial hole by effect of the pressure gradient facing the hole to the valve pipe facing towards the brake caliper, thus allowing a minimum backward flow of brake fluid towards the master cylinder.

Although advantageous in avoiding the formation of a water hammer in the braking circuit upstream of the valve for closing the passage channel provided in the valve body, such a solution is absolutely not free from drawbacks.

Indeed, the resilient seal subjected to repeated loading and unloading cycles is destined to wear prematurely, thus compromising the seal and determining a degrading of the solenoid valve performance. Furthermore, such a solenoid valve is complicated to be manufactured and comprises a large number of parts to be mutually assembled, thus resulting in increased likelihood of failures. Additionally, the even minimum backward flow is guaranteed only if the pressure in the pipe which connects the solenoid valve to the brake caliper exceeds said given threshold value.

The need is therefore felt to provide a controlled check valve solution which is adapted to prevent, or at least strongly limit, the formation of water hammers or overpressures in the hydraulic circuit in which it is fitted, and which at the same time is simpler to be provided than known solutions.

The need is also felt to provide a controlled check valve solution which is adapted to prevent, or at least strongly limit, the formation of water hammers or overpressures in the hydraulic circuit in which it is fitted, and which, although reliable, is simpler to be assembled while having a smaller number of parts as compared to known solutions.

Concurrently, the need is felt to suggest a valve solution capable of providing rapid response times.

Solution

It is an object of the present invention to solve the drawbacks of the prior art and to provide a solution to the needs described hereto with reference to the prior art.

These and other objects are achieved by a valve assembly according to claim 1, and by a brake caliper according to claim 14.

Some advantageous embodiments are the subject of the dependent claims.

DRAWINGS

Further features and advantages of the valve assembly and of the caliper body will be apparent from the following description of its preferred embodiments, given by way of non-limiting examples, with reference to the accompanying figures, in which.

DESCRIPTION OF SOME PREFERRED EMBODIMENTS

Figure 1:
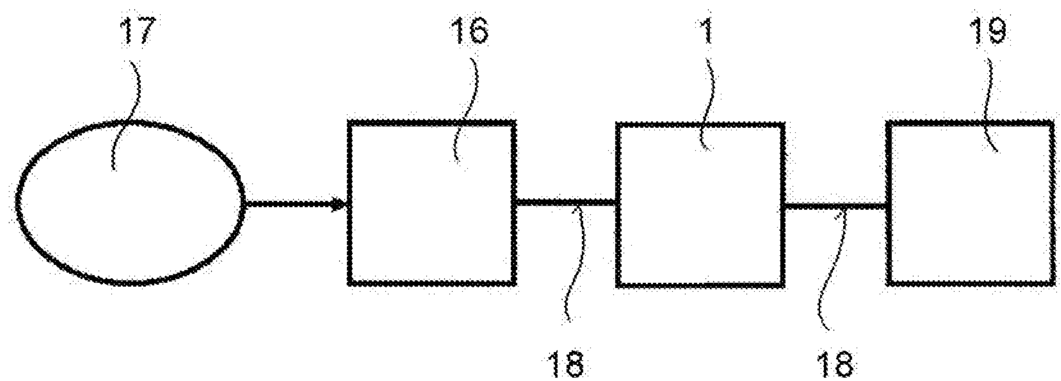
FIGS. 1 and 2 are block charts, which diagrammatically illustrate a braking system comprising a valve assembly according to some embodiments.
Figure 2:
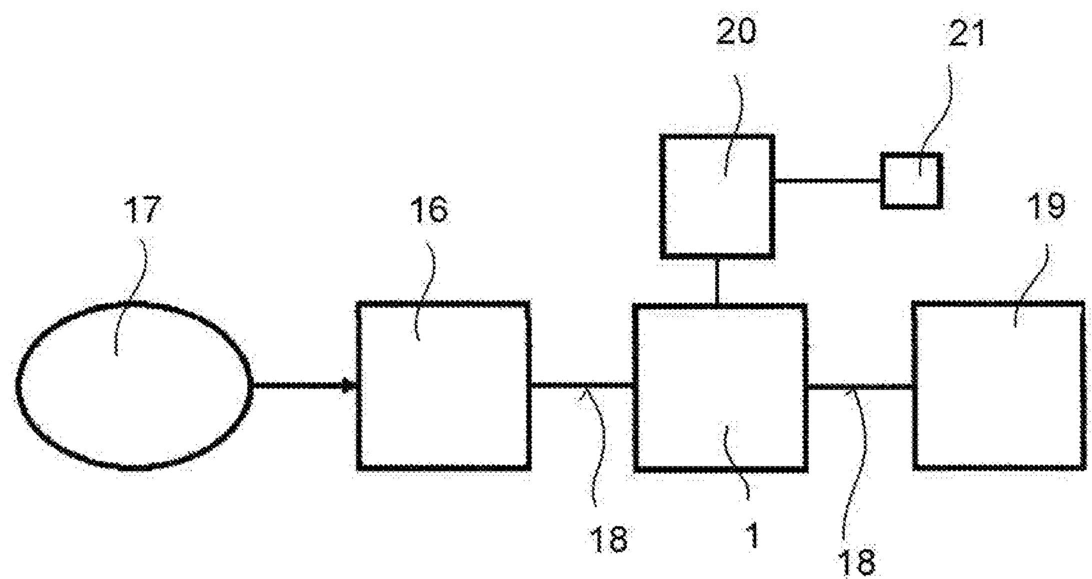
Figure 3:
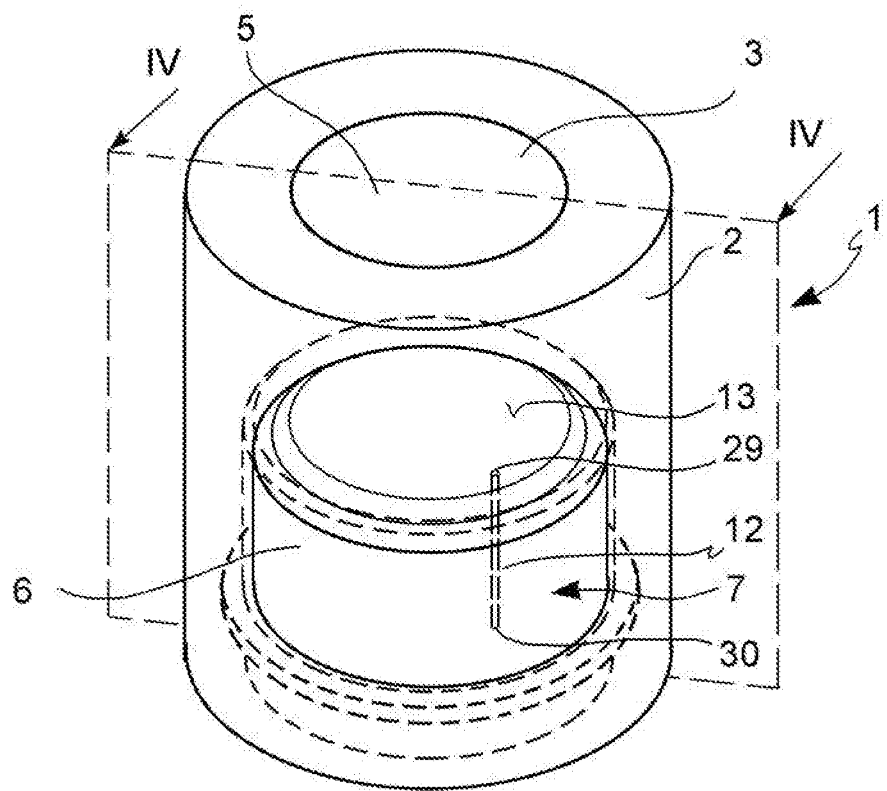
FIG. 3 is an axonometric view which illustrates a valve assembly, according to an embodiment.
Figure 4:
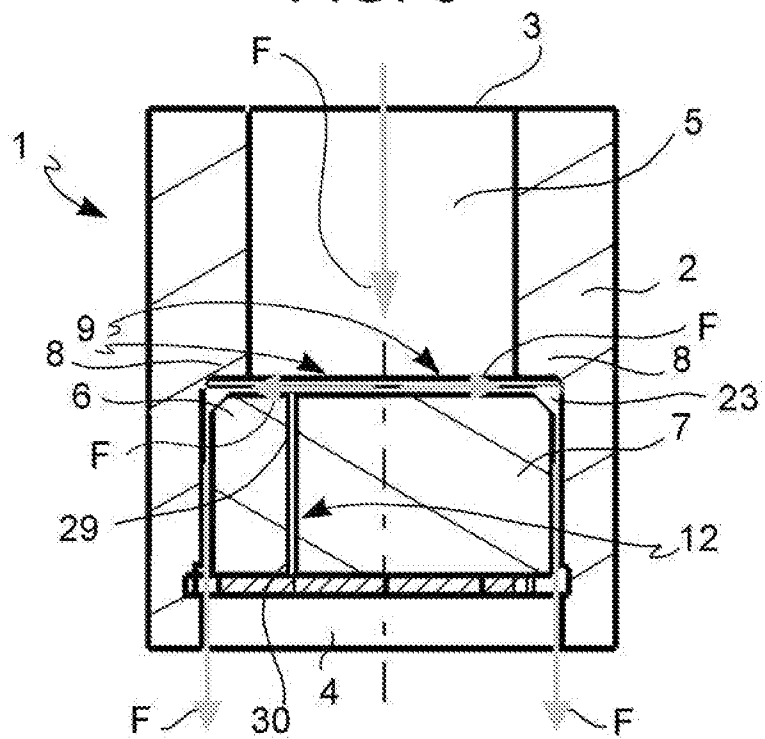
FIG. 4 is a section view taken along the cutting plane indicated by the arrows IV-IV in FIG. 3.
Figure 5:
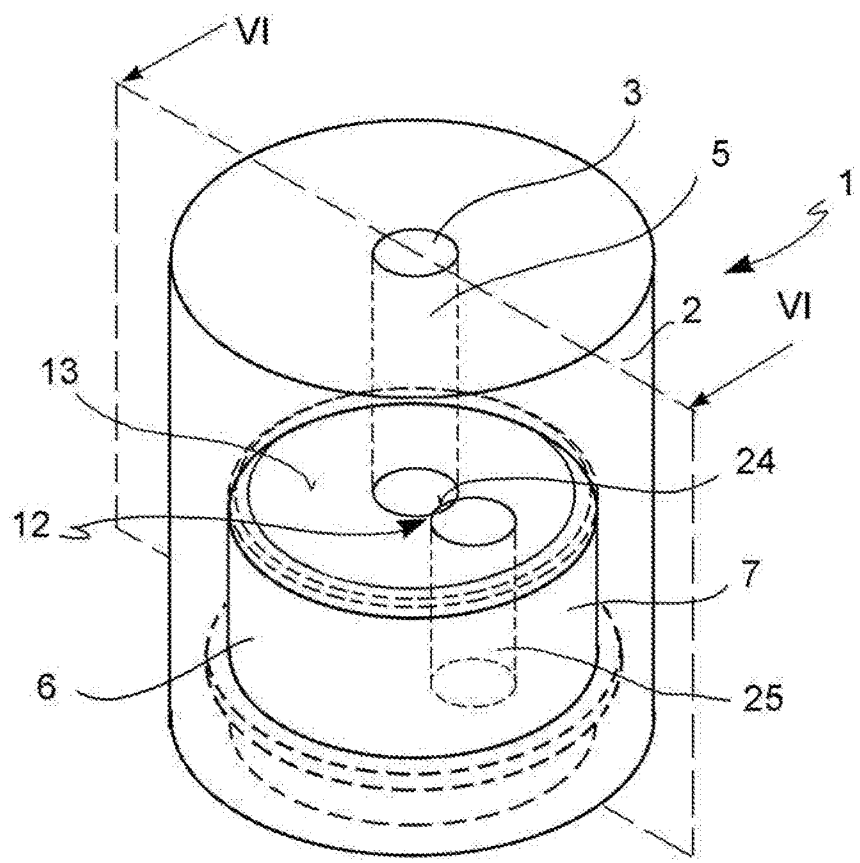
FIG. 5 is an axonometric view which illustrates a valve assembly, according to an embodiment.
Figure 6:
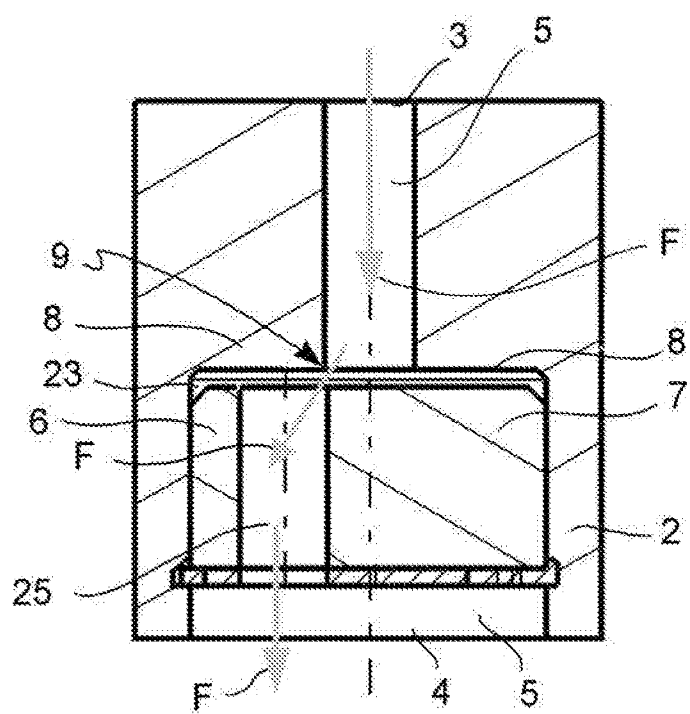
FIG. 6 is a section view taken along the cutting plane indicated by the arrows VI-VI in FIG. 5.
Figure 7:
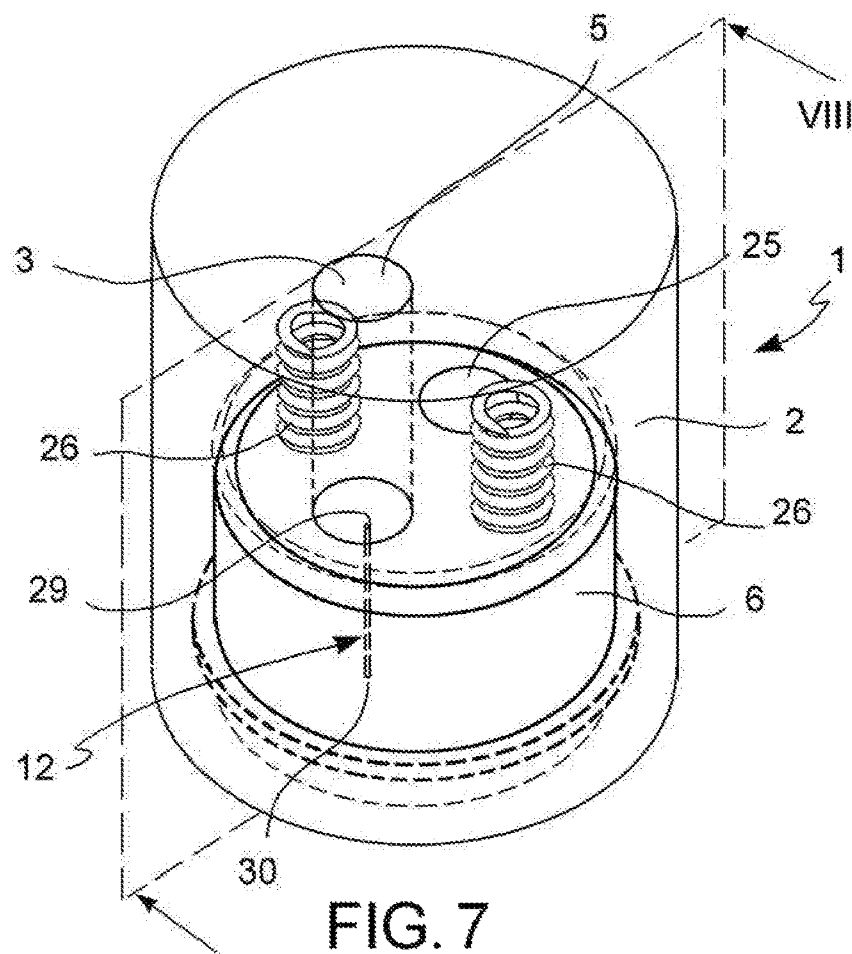
FIG. 7 is an axonometric view which illustrates a valve assembly, according to an embodiment.
Figure 8:
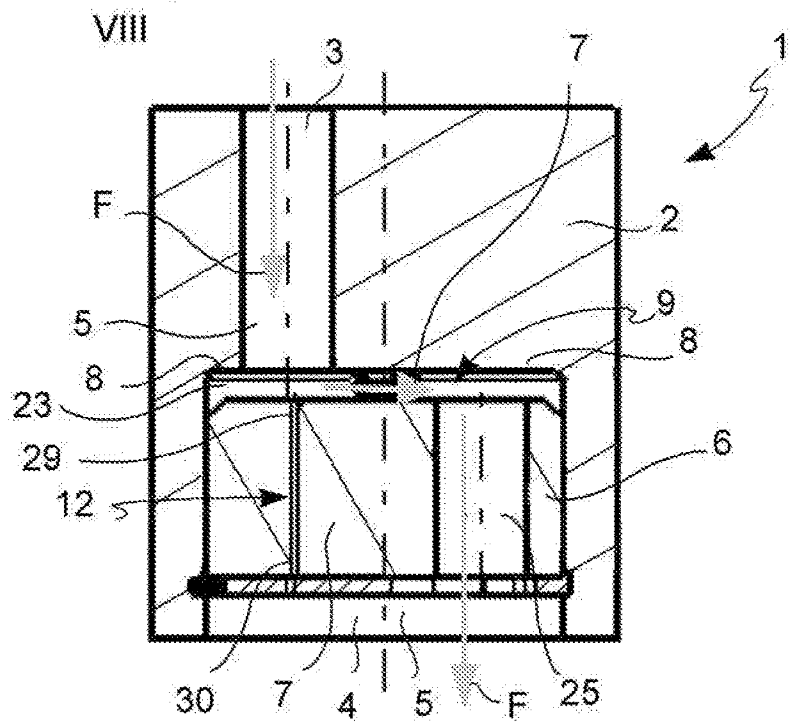
FIG. 8 is a section view taken along the cutting plane indicated by the arrows VIII-VIII in FIG. 7.
Figure 10:
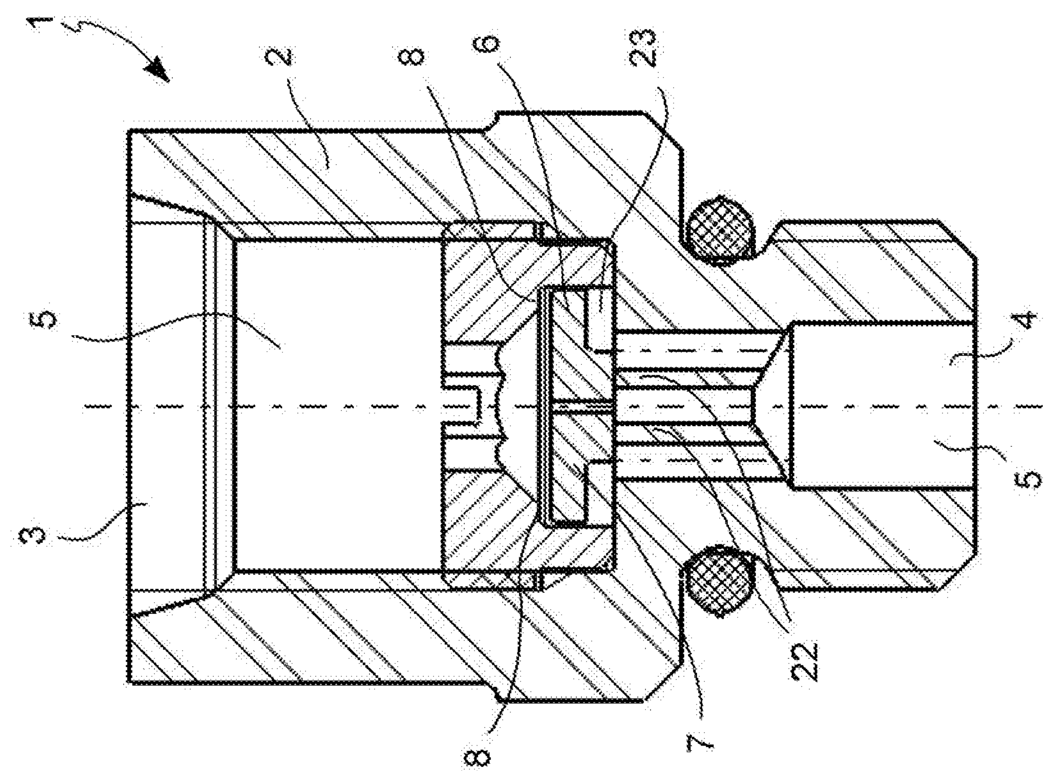
FIG. 10 is a second view taken from the point of view indicated by the arrow X in FIG. 9.
Figure 9:
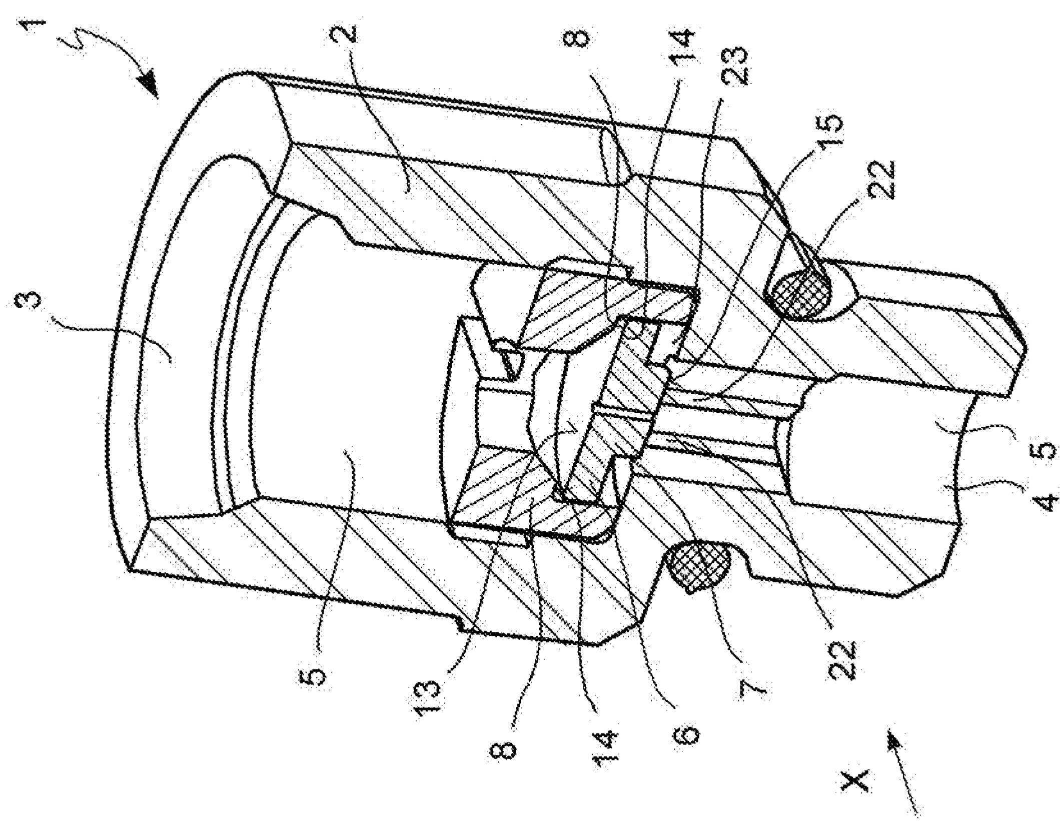
FIG. 9 is an axonometric section view of a valve assembly, according to an embodiment.
Figure 12:
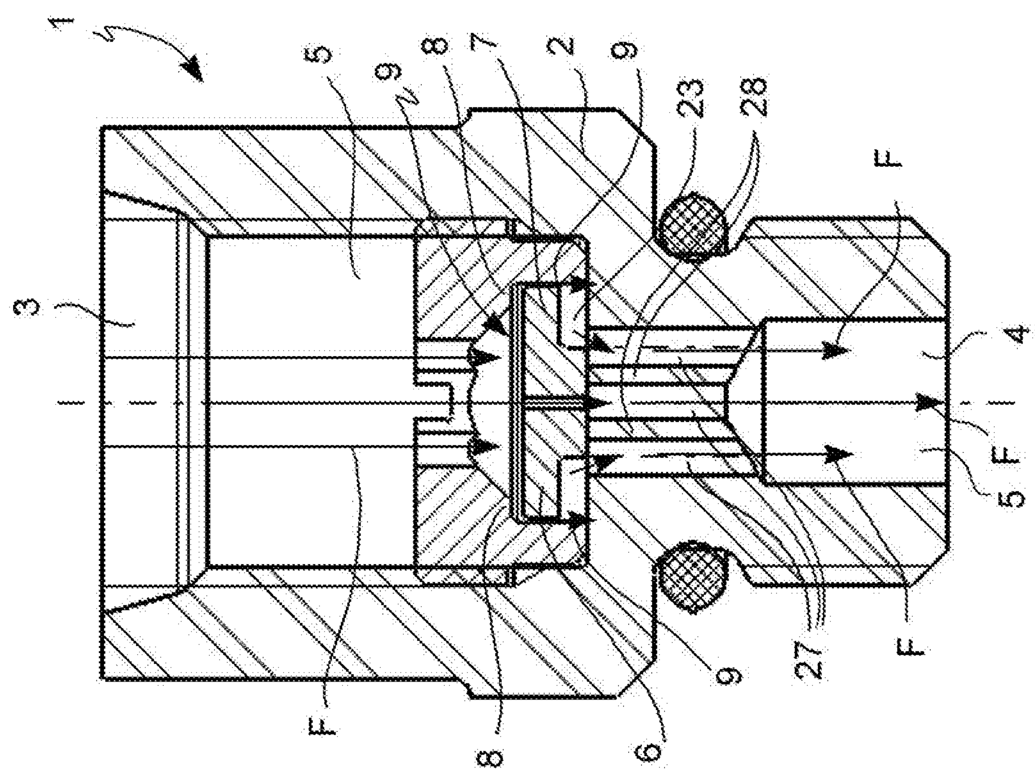
FIG. 12 is a section view taken from the point of view indicated by the arrow XII in FIG. 11.
Figure 11:
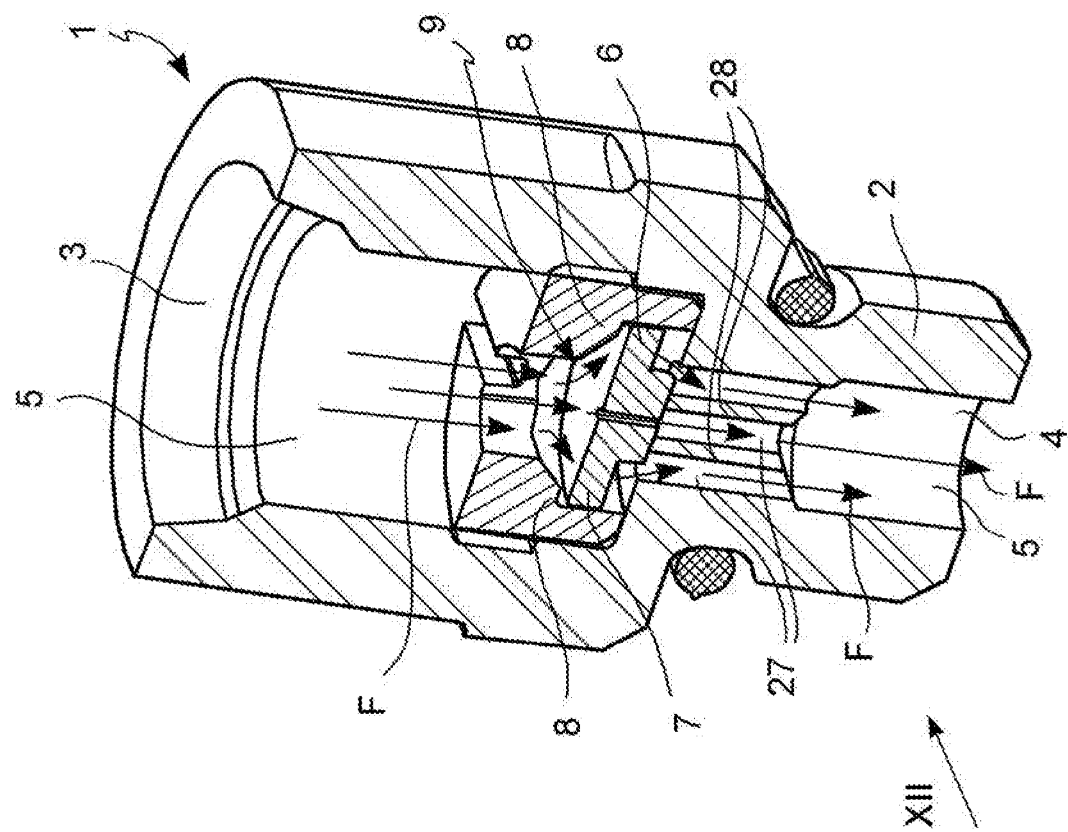
FIG. 11 is an axonometric and section view of a valve assembly, according to an embodiment, in which the shutter body is in valve opening position.
Figure 14:
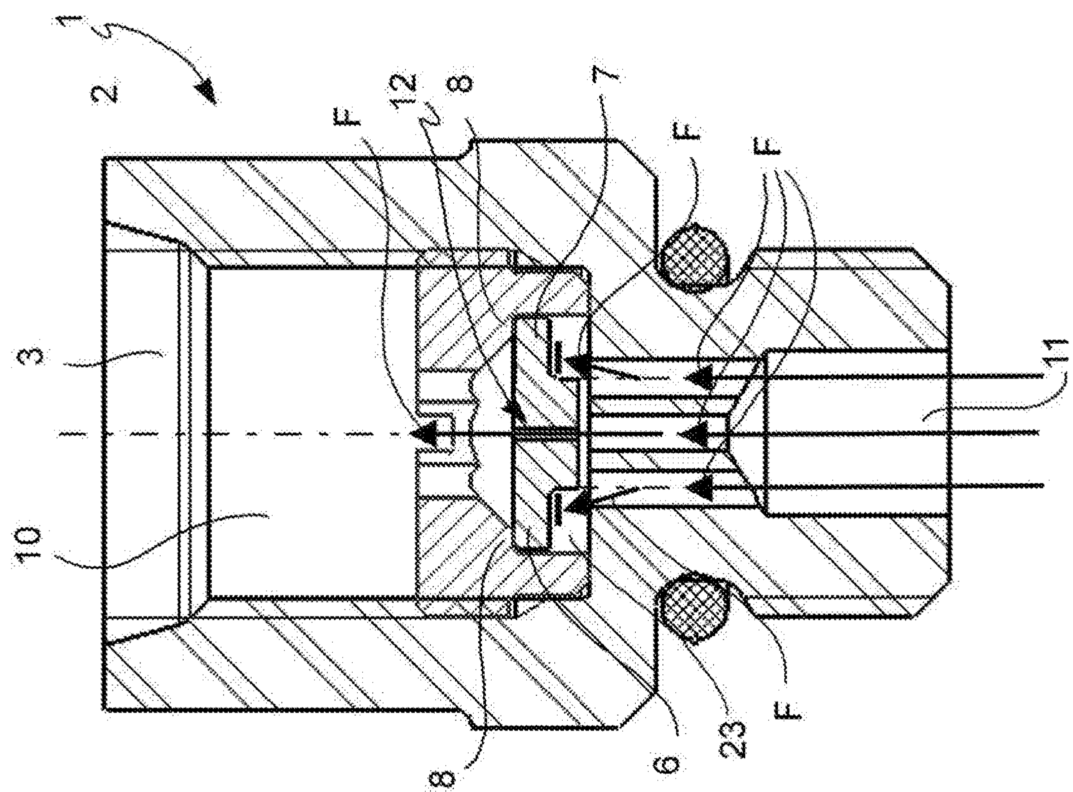
FIG. 14 is a section view taken from the point of view indicated by the arrow XIV in FIG. 13.
Figure 13:
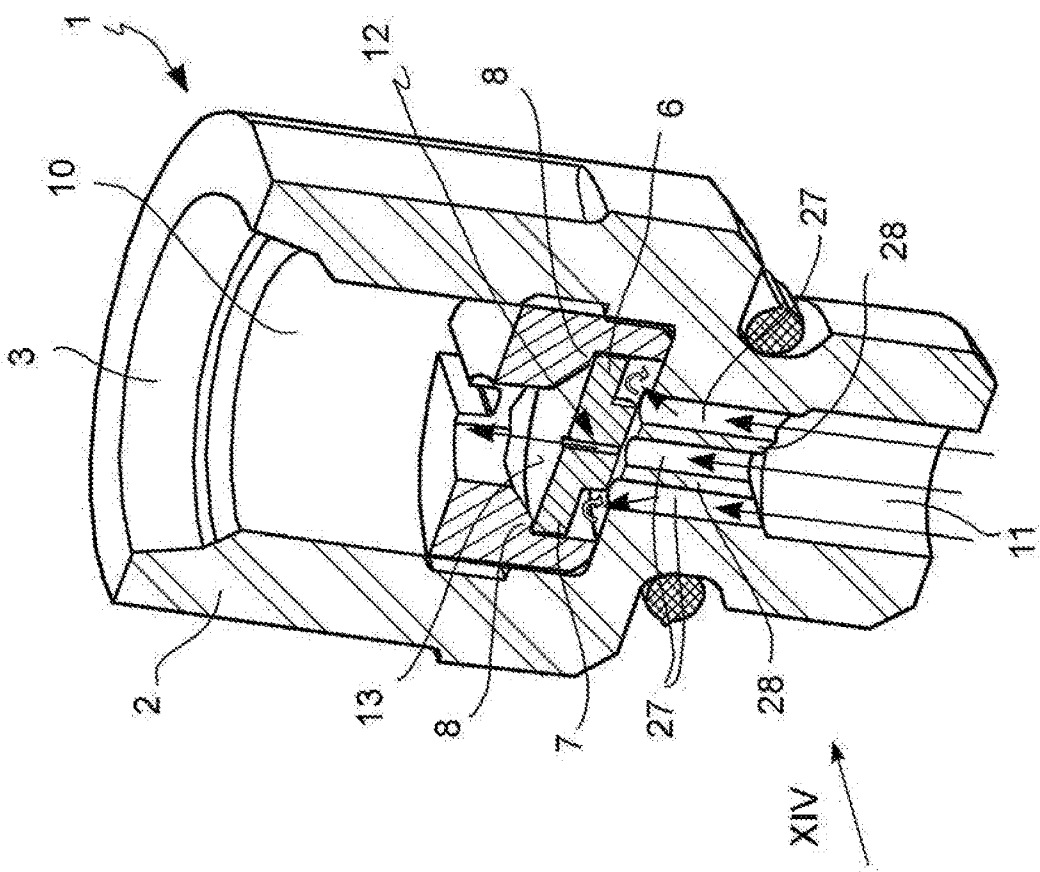
FIG. 13 is an axonometric and section view of a valve assembly, according to an embodiment, in which the shutter body is in valve closing position.
Figure 16:
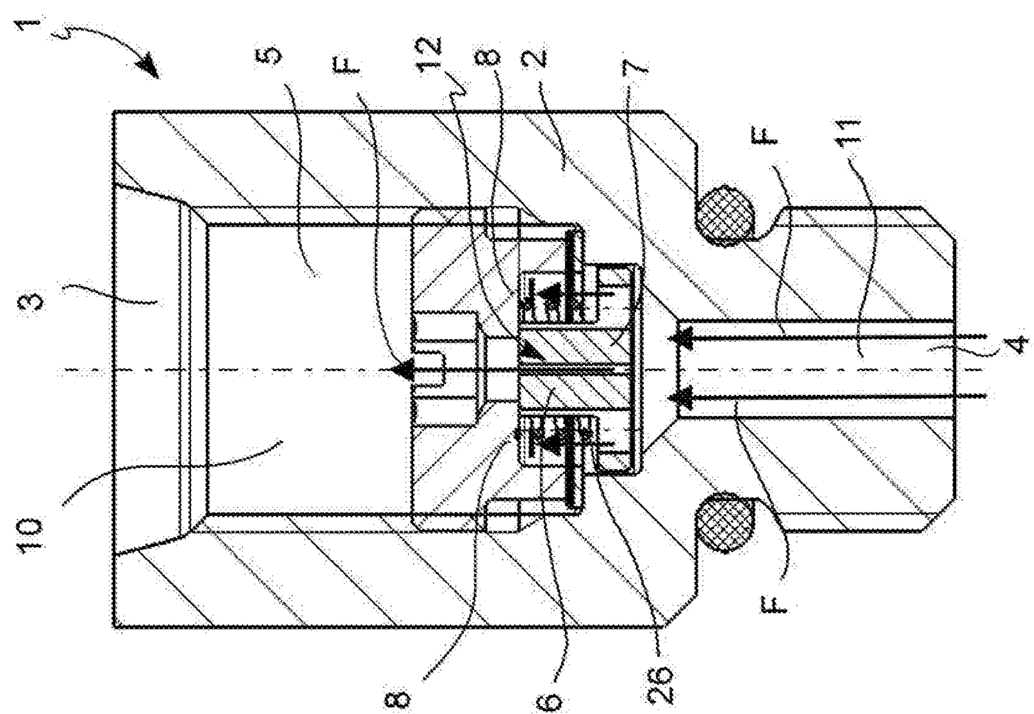
FIG. 16 is a section view of the valve assembly illustrated in FIG. 15, in which the shutter body is in valve closing position.
Figure 15:
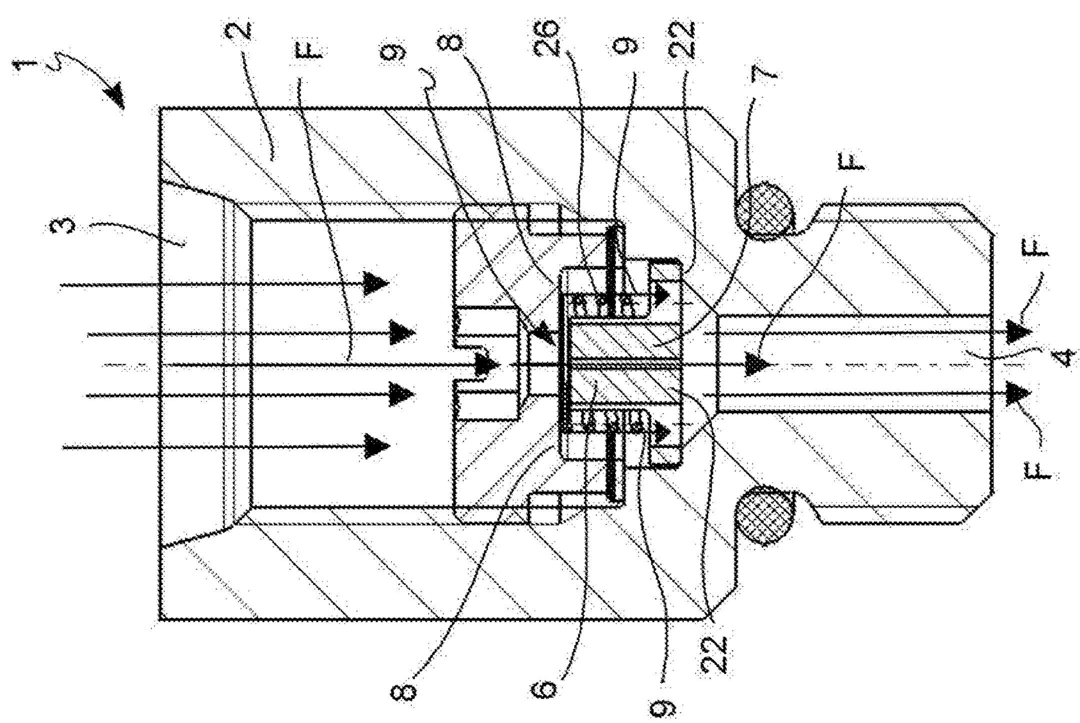
FIG. 15 is a section view of a valve assembly, according to an embodiment, in which the shutter body is in valve opening position.
Figure 18:
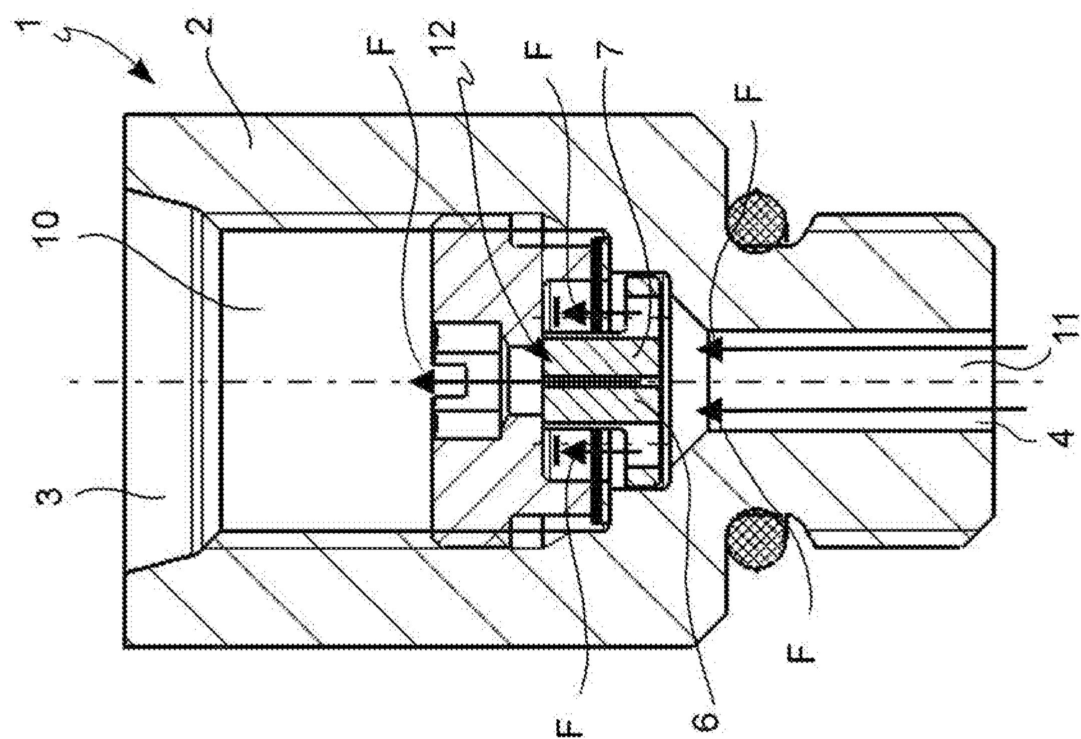
FIG. 18 is a section view of the valve assembly illustrated in FIG. 17, in which the shutter body is in valve closing position.
Figure 17:
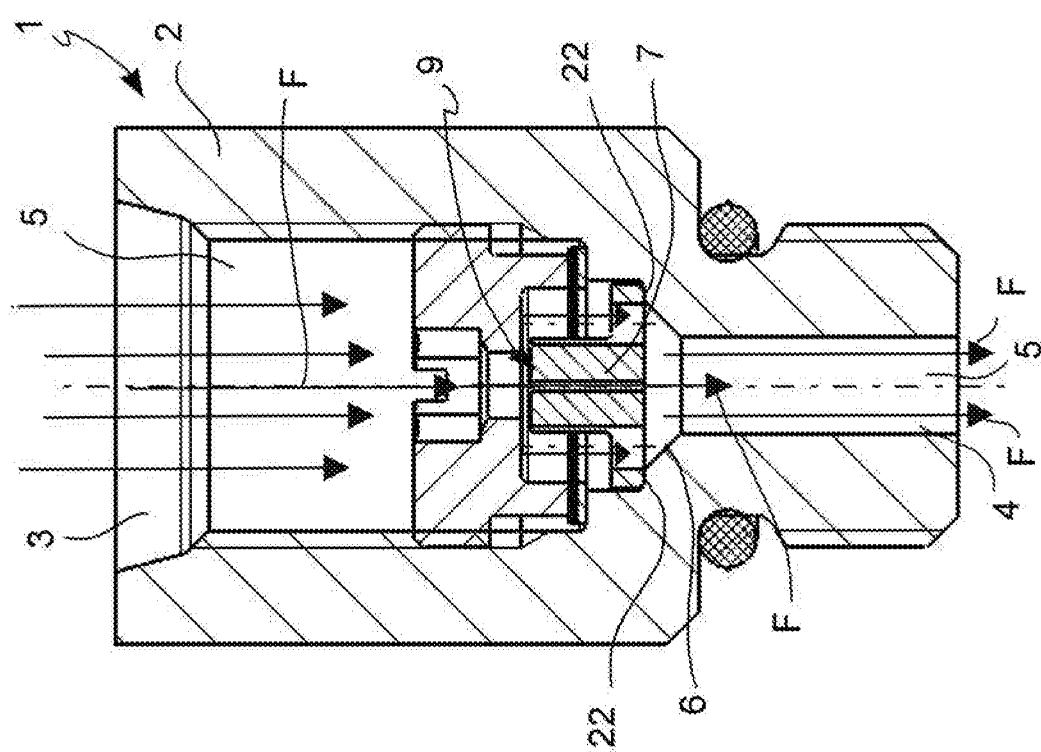
FIG. 17 is a section view of a valve assembly, according to an embodiment, in which the shutter body is in valve opening position.
Figure 19:
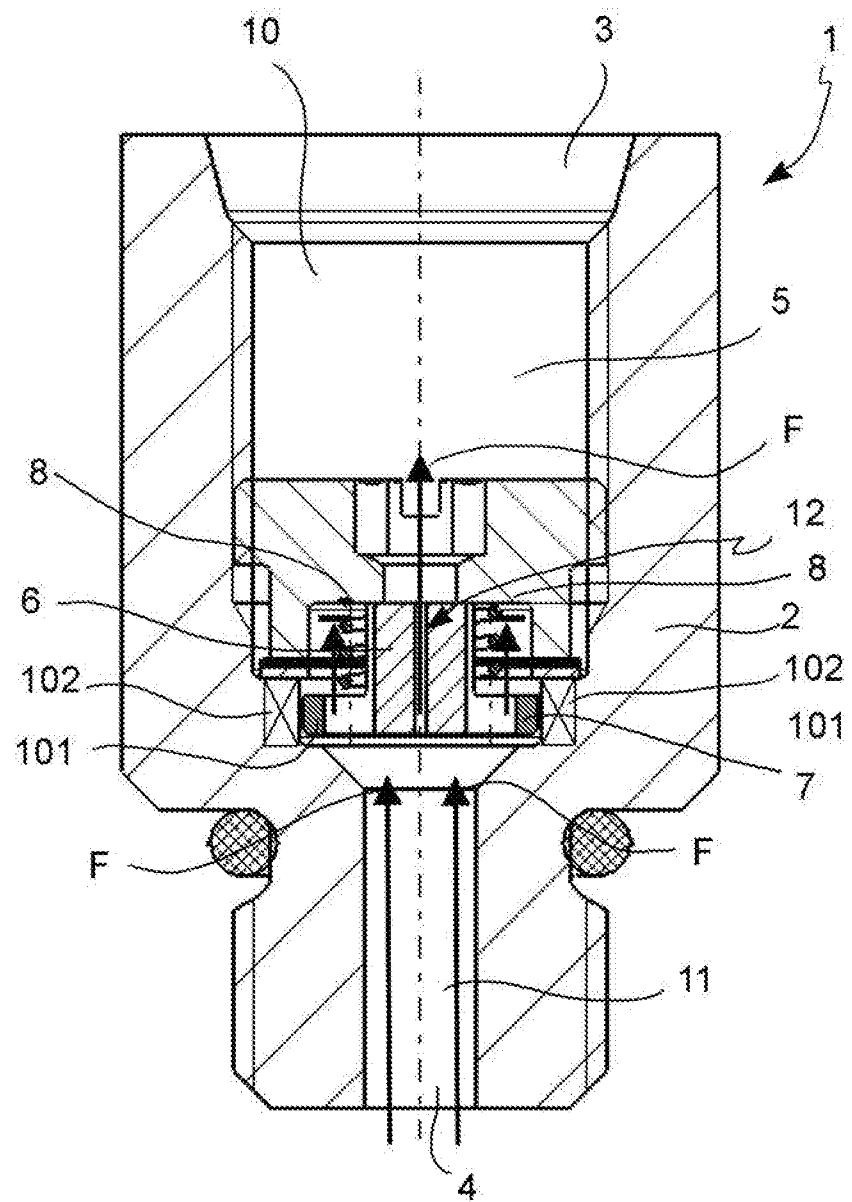
FIG. 19 shows a section view of a valve assembly of the electro-actuated type according to an embodiment of the invention.
Figure 20:
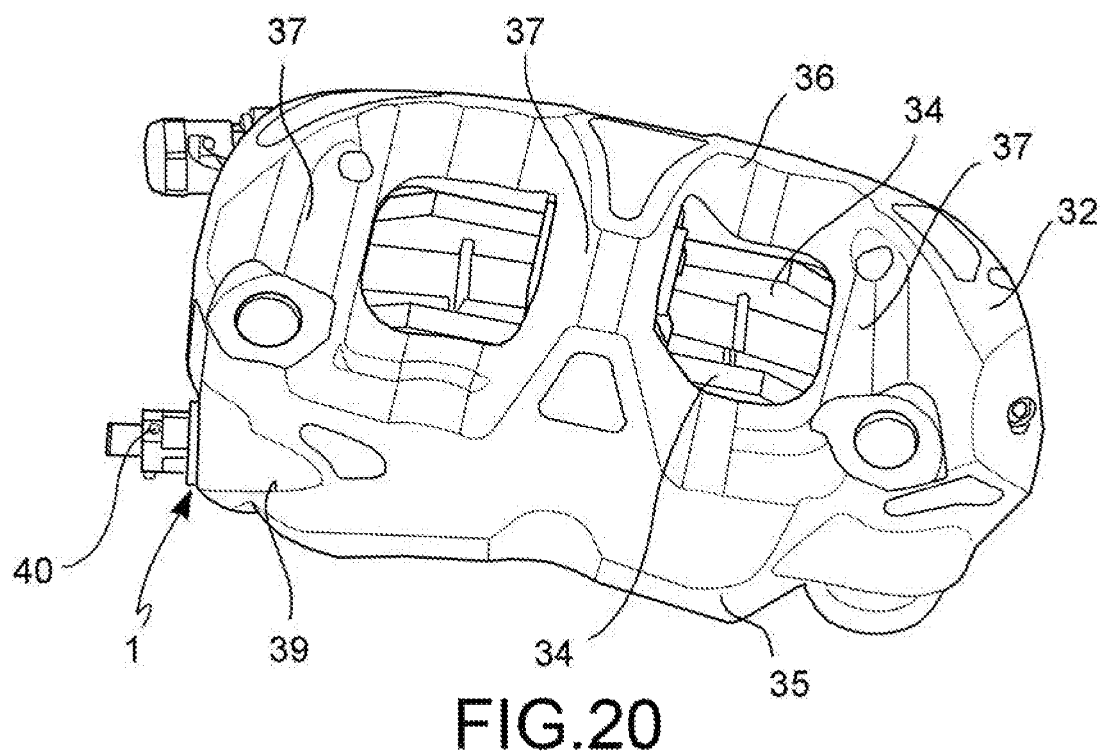
FIG. 20 is an axonometric view of a brake caliper comprising a caliper body, according to an embodiment.
Figure 21:
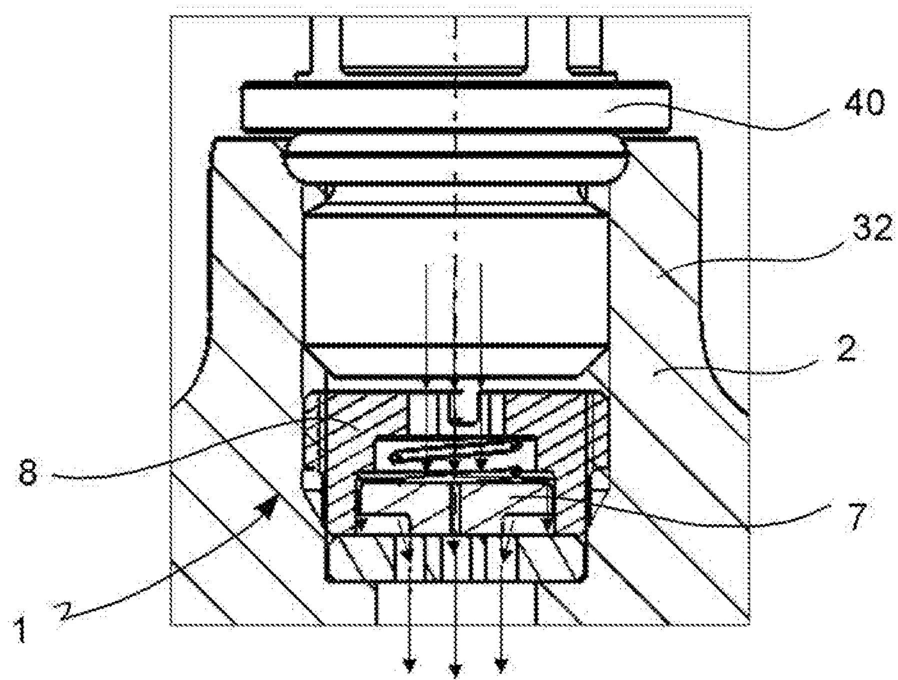
FIG. 21 is a section view of a valve assembly, according to an embodiment, in which the flow is directed towards the caliper, in which the shutter body is in valve opening position.
Figure 22:
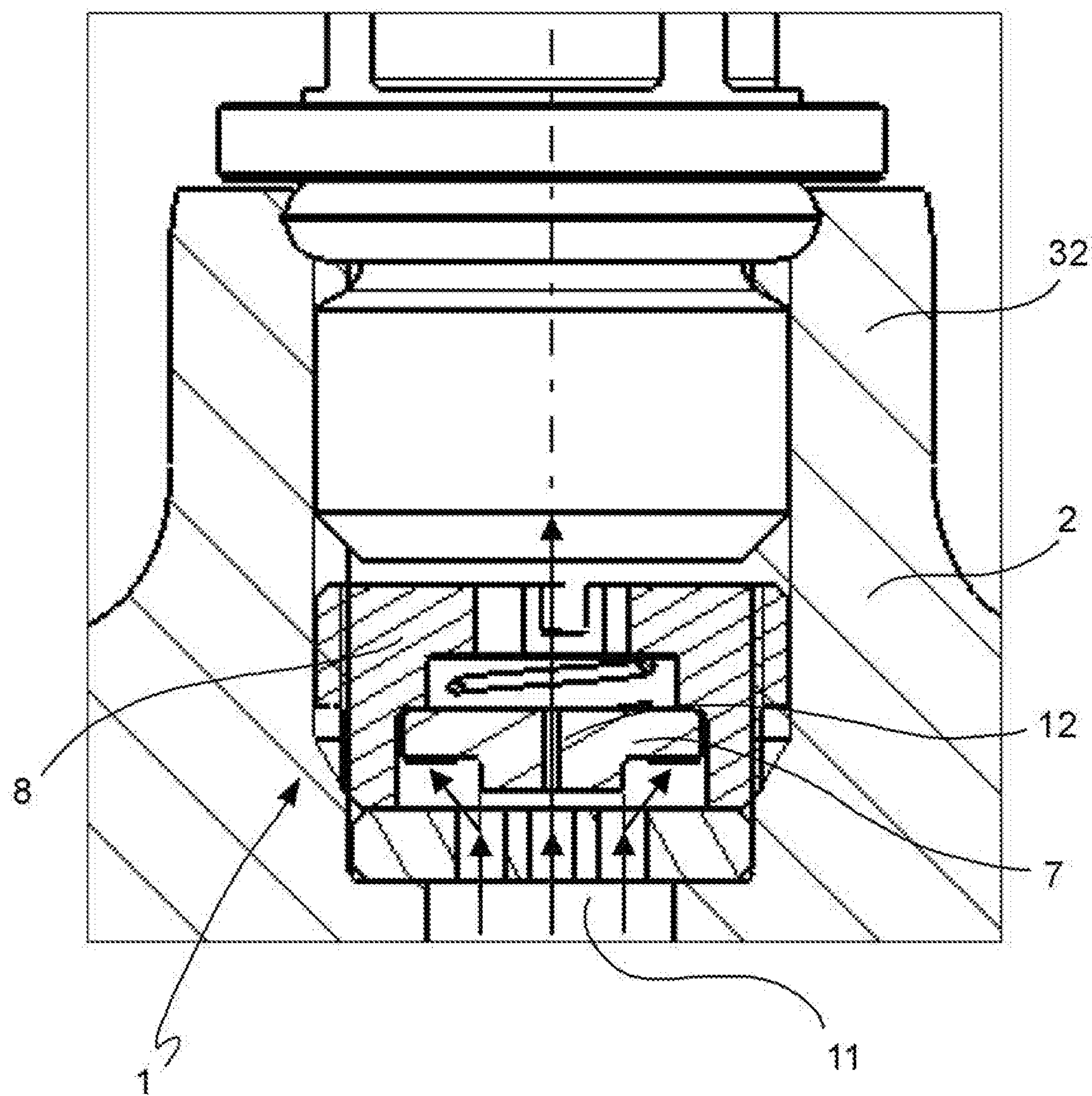
FIG. 22 is a section view of the valve assembly of FIG. 21, in which the flow is directed away from the caliper, in which the shutter body is in valve closing position.

A valve assembly 1 for a braking system is provided according to a first general embodiment.

Said valve assembly 1 is particularly adapted, but not exclusively intended for applications in a disc brake system. Said valve assembly 1 may be used in a drum brake system, as well as a pad brake system.

Said valve assembly 1 comprises a valve body 2, which at least partially delimits a master cylinder side opening 3, at least one caliper side opening 4, and at least one valve pipe 5, which puts said master cylinder side opening 3 and said caliper side opening 4 into fluid communication.

A braking system comprises a braking circuit comprising at least one master cylinder assembly 16, which can be actuated by means of a control device 17, such as for example a brake pedal of a motor vehicle or a control lever of a handlebar of a motorcycle, at least one valve assembly 1, at least one braking device 19, e.g. a brake caliper 19 and/or thrust means of a brake caliper 19 adapted to apply a thrust action onto at least one brake pad 34 which can be associated with the brake caliper 19, and connection pipes 18. Preferably, said master cylinder assembly 16 either comprises or is associated with a brake fluid tank.

According to an embodiment, said valve assembly 1 comprises an electromagnetic actuator, e.g. a solenoid, controlled by a data processing control unit 20, which cooperates with at least one sensor 21, e.g. adapted to detect the speed of at last one wheel of the vehicle.

Preferably, said master cylinder side opening 3 is adapted to associate with a brake fluid feeding pipe from the master cylinder assembly 16 and said caliper side opening 4 is adapted to associate with a brake fluid efflux pipe towards the brake caliper 19.

Said valve assembly 1 comprises a shutter element 6 housed in said valve pipe 5.

Said caliper side opening 4 is fluidically opposite to said master cylinder side opening 3 with respect to said shutter element 6.

Said shutter element 6 comprises a shutter body 7 movable with respect to the valve body 2 between a valve closing position, in which said shutter body 7 abuts against a first abutment portion 8 of the valve body 2, and at least one valve opening position, in which said shutter body 7, distanced from said first abutment portion 8 of the valve body 2, delimits at least one main fluid passage 9 which laps on said shutter body 7 with said valve body 2.

By providing said main fluid passage 9, a rapid efflux of the brake fluid pushed by the master cylinder assembly 16 towards the caliper side opening 4 and thus towards said brake caliper 19 is allowed.

With reference to the accompanying figures, the arrow F diagrammatically indicates the flow of brake fluid inside said valve pipe 5 of the valve assembly 1.

According to an embodiment, said valve body 2 is made in one piece. In other words, said valve body 2 is a single block valve body.

According to an embodiment, when the master cylinder assembly 16 is activated, said shutter body 7 is in the valve opening position to allow a rapid efflux of brake fluid towards said caliper side opening 4.

According to an embodiment, said abutment portion 8 of the valve body 2 is made in one piece separate from said valve body 2. According to an embodiment, said first abutment portion 8 of the valve body 2 is made of resilient material, e.g. seal material, e.g. rubber or similar material. Preferably, said abutment portion 8 of the valve body 2 is made of aluminum and/or titanium.

According to an embodiment, said abutment portion 8 of the valve body 2 is made in one piece with said valve body 2.

According to an embodiment, said shutter body 7 comprises a master cylinder side surface 13, facing said master cylinder side opening 3, wherein said master cylinder surface 13 of the shutter body 7 abuts against a first abutment surface 14 of said first abutment portion 8 of the valve body 2.

According to an embodiment, said first abutment surface 14 is made on a portion of said abutment portion 8 of the valve body 2 placed undercut with respect to said master cylinder side opening 3.

According to an embodiment, said shutter body 7 comprises a caliper side surface 15, opposite to said master cylinder side surface 3 of said shutter body 7 and facing said caliper side opening 4 of the valve body 2. According to an embodiment, when said shutter body 7 is in said at least one opening position, said caliper side surface 15 of the shutter body 7 abuts against a second abutment surface 22, opposite to said first abutment portion 8 with respect to said shutter element 6.

According to a preferred embodiment, said first abutment portion 8 and said second abutment portion 22 delimit a shutter housing chamber 23, adapted to limit the stroke of said shutter body 7, in said valve pipe 5.

According to an embodiment, the walls of said valve body 2 facing said master cylinder side pipe stretch 10 are threaded. According to an embodiment, said abutment portion 8 of the valve body 2 is made on a threaded member, e.g. a master cylinder side travel stop element 31, which engages the threaded walls of the valve body 2 facing said master cylinder side pipe stretch 10, so as to allow the adjustment of the stroke of the shutter body 7. In other words, by providing said master cylinder side travel stop element 31, e.g. a ring nut, the size of the shutter housing chamber 23 can be adjusted, by adjusting the relative distance between said first abutment portion 8 and said second abutment portion 22.

According to an embodiment, said valve body 2 is made in one piece with the caliper body 32 of a brake caliper 19 which can be associated with said valve assembly 1.

According to an embodiment, said valve assembly 1 comprises a caliper side travel stop element 33 made in a separate piece with respect to the valve body 2, in which said caliper side travel stop element comprises said second abutment portion 22. According to an embodiment, said caliper side travel stop element 33 is associated with said valve body 2 by means of fixing means, e.g. threaded fixing means, so as to allow to adjust the position of said caliper side travel stop element 33 adjusting the size of the shutter chamber 23, by adjusting the relative distance between said first abutment portion 8 and said second abutment portion 22.

When said shutter body 7 is in the valve closing position, it interrupts said at least one main fluid passage 9 and defines a master cylinder side pipe stretch 10 facing said master cylinder side opening 3 and a caliper side pipe stretch 11 facing said caliper side opening 4 in said valve pipe 5. According to an embodiment, said master cylinder side surface 13 of said shutter body 7 faces said master cylinder side pipe stretch 10 and said caliper side surface 15 of said shutter body 7 faces said caliper side pipe stretch 11.

According to an embodiment, said master cylinder side pipe stretch 10 and said caliper side pipe stretch 11 are defined also when said shutter body 7 is in said at least one opening position.

Said shutter body 7 at least partially delimits at least one secondary fluid passage 12, so that, when said shutter body 7 is in valve closing position, said master cylinder side pipe stretch 10 is in fluid communication with said caliper side pipe stretch 11 only through said secondary fluid passage 12.

By providing said second flow passage 12, a predetermined counter-efflux of brake fluid is allowed towards the master cylinder side opening 3, and thus towards the master cylinder assembly 16, when the shutter body 7 is in valve closing position.

By virtue of the secondary passage 12, the communication can be kept open between the caliper side or user side and the master cylinder side or feeding circuit side, also with the shutter body 7 closed.

This feature, in an application for a disc brake caliper body, allows to avoid the non-retraction of the pistons, and the same time to avoid having a residual torque created by the brake pads on the braking surfaces of the disc brake. In other words, residual torque is avoided by gradually reducing the pressure peak which is generated between caliper and valve during the phenomena which lead to the closing of the latter. In absence of the secondary passage it would not be possible to "discharge" the pressure present in the caliper, thus leaving the wheel of the vehicle undesirably braked for much longer than desired by the driver.

According to an embodiment, said secondary fluid passage 12 has a first secondary passage mouth 29, which leads onto said master cylinder side surface 13 of the shutter body 7, and an opposite secondary passage mouth 30, which leads onto said caliper side surface 15 of said shutter body 7.

According to an embodiment, the cross section of said second fluid passage 12 is much smaller than the cross section of said valve pipe 5. According to an embodiment, the cross section of said secondary fluid passage 12 is much smaller than the cross section of said master cylinder side pipe stretch 10 and of said caliper side pipe stretch 11. The expression "cross section" means the section orthogonal to the longitudinal development of a vessel. According to an embodiment, if a vessel has two or more branches in parallel, the cross section is the sum of the cross sections of the single branches.

According to an embodiment, said shutter body 7 and said valve body 2 jointly delimit said secondary fluid passage 12.

According to an embodiment, said secondary fluid passage 12 is delimited by at least one groove made on said shutter body 7 and by the walls of said valve body facing said valve pipe 5.

According to an embodiment, said shutter body 7 delimits said secondary fluid passage 12, thus preventing said valve body 2 from also only partially delimiting said secondary fluid passage 12.

According to a preferred embodiment, the cross section of said secondary fluid passage 12 is contained within the dimension of said shutter body 7. According to an embodiment, the dimension of said secondary fluid passage 12 is entirely contained within the dimension of said shutter body 7.

According to an embodiment, said at least one secondary fluid passage 12 is formed by said at least one through hole made in said shutter body 7.

According to an embodiment, said at least one secondary fluid passage 12 comprises a first secondary passage mouth 29, which leads into said master cylinder side pipe stretch 10, and an opposite second secondary passage mouth 30, which leads into said caliper side pipe stretch 11.

According to an embodiment, said secondary fluid passage 12 is a subset of said main fluid passage 9.

According to an embodiment, said secondary fluid passage 12 is a portion of said main fluid passage 9.

According to an embodiment, said shutter body 7 at least partially delimits a portion of said caliper side pipe stretch 11.

According to an embodiment, said valve pipe 5 comprises at least one shutter pipe stretch 25 delimited at least by said shutter body 7. Preferably, said shutter pipe stretch 25 leads into said caliper side pipe stretch 11. According to an embodiment, the shutter pipe stretch 5 is jointly delimited by said shutter body 25 and by said valve body 2. According to an embodiment, said shutter pipe stretch 25 is in the form of a through hole entirely delimited by said shutter body 7.

According to an embodiment, said main fluid passage 9 comprises said shutter pipe stretch 25. For example, when said shutter body 7 is in valve opening position, the brake fluid flows into said valve pipe 5 first crossing said master cylinder side opening 3 and then said shutter pipe stretch 25 towards said caliper side opening 4.

According to an embodiment, when said shutter body 7 is in valve closing position, said master cylinder side pipe stretch 10 is in fluid communication with a portion of said shutter pipe stretch 25 through an orifice 24. Thereby, said secondary fluid passage 12 can be accessed by means of said orifice 24. For example, when said shutter body 7 is in valve closing position, the brake fluid flows into said valve pipe 5 through said caliper side opening 4, then through said caliper side pipe stretch 11, then through said shutter pipe 25, then through said orifice 24 towards said master cylinder side pipe stretch 10.

According to an embodiment, said secondary fluid passage 12 comprises said at least one shutter pipe 25, so as to put into fluid communication said master cylinder side surface 13 and said caliper side surface 15 of said shutter body 7 also when the shutter body is in the valve closing position.

Preferably, said shutter pipe stretch 25 is formed by at least one through hole made in said shutter body 7, thus avoiding to provide a further valve, e.g. a ball valve, adapted to close said shutter pipe stretch 25 selectively.

According to a preferred embodiment, said master cylinder side pipe stretch 10, said shutter pipe stretch 25 and said caliper side stretch 11 are substantially and mutually aligned, thus defining a substantially rectilinear flow direction which joins said master cylinder side opening 3 and said caliper side opening 4.

According to an embodiment, said master cylinder side opening 3 is substantially coaxial with said caliper side opening 4.

According to an embodiment, said master cylinder side pipe stretch 10, said shutter pipe stretch 25 and said caliper side pipe stretch 11 are substantially and mutually coaxial.

According to an embodiment, the longitudinal development axis of said master cylinder side pipe stretch 10 is either offset or misaligned with respect to the longitudinal development axis of caliper side pipe stretch 11.

According to an embodiment, said secondary fluid passage 12 is given by the superimposition between the cross section of said master cylinder side pipe stretch 10 and the cross section of said shutter pipe stretch 25.

According to an embodiment, said secondary fluid passage 12 avoids comprising said shutter pipe stretch 25. In other words, said secondary fluid passage 12, although delimited by said shutter body 7, is disunited from said shutter pipe stretch 25. According to an embodiment, when said shutter body 7 is in valve closing position, said shutter pipe 25 is occluded by said abutment surface 14 of the valve body, thus preventing the counter-efflux of the brake fluid through said shutter pipe stretch 25 towards said master cylinder side opening 3. For example, when said shutter body 7 is in valve closing position, the brake fluid flows into said valve pipe 5 through said caliper side opening 4, then through said caliper side pipe stretch 11, then through said secondary fluid passage 12 towards said master cylinder side pipe stretch 10.

According to an embodiment, said shutter body 7 delimits said secondary fluid passage 12 and said shutter pipe stretch 25.

According to an embodiment, said secondary fluid passage 12 puts said master cylinder side opening 3 and said caliper side opening 4 into fluid communication also when said shutter body 7 is in opening position.

According to an embodiment, said valve assembly 1 comprises at last one elastic element 26 which preferably and elastically biases said shutter body 7 away from said first abutment portion 8 of the valve body 2. According to an embodiment, said elastic device 26 comprises at least one helical spring. According to an embodiment, said elastic device 26 is interposed between said master cylinder side surface 13 of the shutter body 7 and a portion of the valve body 2 to bias said shutter body 7 away from the first abutment portion 8 of the valve body 2.

According to a variant embodiment, said shutter element 6 comprises at least one elastic element 26 which preferably and elastically biases said shutter body 7 abutting against said first abutment portion 8 of the valve body 2.

According to an embodiment, said shutter body 7 is made in one piece.

According to an embodiment, said valve pipe 5 comprises a plurality of drawing branches 27 separated by at least one partition 28. According to an embodiment, said caliper side pipe stretch 11 comprises a plurality of drawing branches 27 separated by at least one partition 28.

According to an embodiment, the walls of said valve body facing said caliper side pipe stretch 10 comprise a tapered portion.

According to an embodiment, the cross section of said master cylinder side pipe stretch 10 is either greater than or equal to the cross section of said caliper side pipe stretch 11.

According to an embodiment, said valve assembly closes the shutter body, in a valve closing position, in which said shutter body 7 abuts against a first abutment portion 8 of the valve body 2, in case of overpressure coming from the caliper body.

According to an embodiment, said valve assembly closes the shutter body, in a valve closing position, in which said shutter body 7 abuts against a first abutment portion 8 of the valve body 2, in case of overpressure coming from the pedal or the brake circuit control lever.

According to an embodiment, said valve assembly comprises an electromagnetic actuator, e.g. a solenoid 102, to move said shutter body 7 between said valve closing portion and said at least one valve opening position. Thereby, a solenoid valve is made, which cooperates with a data processing unit 20, e.g. for activating the anti-locking system or ABS of the wheels.

According to an embodiment, said valve body 1 is electrically actuated.

According to an embodiment, said shutter body 7 comprises at least one permanent magnet member 101 and said valve body 2 is a coil member capable of electro-magnetically facing said permanent magnet structure 101 to bias at least said shutter body 7 during closing.

According to an embodiment, a caliper body 32 for a brake caliper 19 for a braking system of a vehicle is provided, preferably a disc brake braking system further comprising a brake disc. Said caliper body 32 is adapted to straddle a brake disc associable with said caliper body 32.

Said caliper body 32 comprises at least one valve assembly 1 according to any one of the embodiments described above.

According to a preferred embodiment, said caliper body defines said valve body 2 with a portion thereof. In other words, said caliper body 32 at least partially delimits a master cylinder side opening 3, at least one caliper side opening 4, and at least one valve pipe 5, which puts said master cylinder side opening 3 and said caliper side opening 4 into fluid communication.

According to an embodiment, said caliper body 32 is made in a single piece, in other words is of the monoblock type. According to an embodiment, said caliper body 32 is made of separate parts which are assembled to one another, e.g. is of the type comprising two caliper half bodies.

According to an embodiment, a braking system comprising a braking circuit comprising at least one master cylinder assembly 16 which can be actuated by means of a control device 17, such as for example a brake pedal of a motor vehicle or a control lever of a handlebar of a motorcycle, said at least one valve assembly 1, at least one braking device 19, adapted to straddle an associable brake disc, said brake caliper 19 comprising said caliper body 32, and connection pipes 18. Preferably, said master cylinder side opening 3 is adapted to associate with a brake fluid feeding pipe from the master cylinder assembly 16 and said caliper side opening 4 is adapted to be associated with a brake fluid efflux pipe towards the thrust means adapted to apply a thrust action on at least one brake pad 34 of said brake caliper 19, during the braking operation. Preferably, said thrust means comprise at least one hydraulically actuated cylinder-piston assembly.

According to an embodiment, said caliper body 32 comprises at least two opposite elongated portions 35,36, each adapted to either directly or indirectly face, by means of a brake pad 34, one of opposite braking surfaces of a brake disc associable with said caliper body 32, and at least one caliper bridge 37 which connects said two opposite elongated portions 35,36 to each other. According to an embodiment, at least one of said two opposite elongated portions 35, 36 of the caliper body 32 comprises at least one valve assembly 1, e.g. associated with a plug or connection coupling 40 for connecting to a hydraulic system.

According to an embodiment, said caliper body 32 defines a side facing the disc, adapted to face a brake disc which can be associated with the caliper body 32, and a disc opposite side 39, facing opposite with respect to said side facing the disc. Preferably, said master cylinder side opening 3 of said valve assembly 1 is made on said disc opposite side 39 of the caliper body 32. According to an embodiment, said disc opposite side 39 of the caliper body 32 delimits said master cylinder side opening 3 of the valve assembly 1.

According to an embodiment, a brake caliper 19 for a braking system of a vehicle comprises at least one caliper body 32 according to any one of the embodiments described above, at least one brake pad 34, and thrust means adapted to apply a thrust action on said at least one brake pad 34 during the braking action.

By virtue of the features described above, either mutually separately or jointly in particular embodiments, a valve assembly can be obtained which also satisfies the aforesaid, even mutually contrasting needs and the aforesaid desired advantages, and in particular:

- a valve assembly is provided which allows the brake fluid to flow readily towards the braking device, e.g. the brake caliper, when the shutter body is in valve opening position, and which allows a minimum brake fluid counter-efflux towards the master cylinder, when the shutter body is in valve closing position;

- a valve assembly is provided, which is capable of supplying quick response times;
- a lighter shutter element than known solutions is provided;
- a heavy flow-back of brake fluid towards the tank and the master cylinder can be contrasted in case of undesired retraction of the caliper piston or pistons, e.g. due to brake disc vibration, without at the same time determining an excessive overpressure in the braking circuit branch between the brake caliper and the valve assembly;
- a valve assembly is provided with allows the fluid to flow readily towards the braking device, preferably the brake caliper, when the shutter body is in valve opening position, and if the valve is electro-actuated and commanded during closing which allows a minimum efflux of brake fluid towards the brake caliper, when the shutter body is in valve closing position to control a wheel anti-locking system for example, while avoiding the generation of excessive overpressure in the braking system between the valve assembly and the lever and the brake pedal;
- a brake caliper is provided having said valve assembly integrated in the caliper body.

Those skilled in art may make many changes, adaptations to the embodiments described above or may replace elements with others which are functionally equivalent in order to meet contingent needs without however departing from the scope of the following claims.

LIST OF REFERENCES

1. Valve assembly
2. Valve body
3. Master cylinder side opening
4. Caliper side opening
5. Valve pipe
6. Shutter element
7. Shutter body
8. First abutment portion of the valve body
9. Main fluid passage
10. Master cylinder side pipe stretch
11. Caliper side pipe stretch
12. Secondary fluid passage
13. Master cylinder side surface of the shutter body
14. First abutment surface of the valve body
15. Caliper side surface of the shutter body
16. Master cylinder assembly
17. Control device
18. Connection pipe
19. Braking device
20. Processing control unit
21. Sensor
22. Second abutment portion
23. Shutter housing chamber
24. Orifice
25. Shutter pipe stretch
26. Elastic device
27. Drawing branch
28. Partition
29. Secondary passage first opening
30. Secondary passage second opening
31. Master cylinder side travel stop element
32. Caliper body
33. Caliper side travel stop element
34. Brake pad
35. Caliper body elongated portion
36. Opposite caliper body elongated portion
37. Caliper bridge
38. Caliper body disc facing side
39. Caliper body disc opposite side
40. Plug or coupling
101. Electro-actuated valve assembly magnet
102. Electro-actuated valve assembly coil
F. Brake fluid flow

The invention claimed is:

1. A valve assembly (1) for a braking system, comprising:

a valve body (2), which at least partially delimits a master cylinder side opening (3), at least one caliper side opening (4), and at least one valve pipe (5), which puts said master cylinder side opening (3) and said caliper side opening (4) into fluid communication;

a shutter element (6) housed in said valve pipe (5);

wherein said caliper side opening (4) is fluidically opposite to said master cylinder side opening (3) with respect to said shutter element (6);

and wherein said shutter element (6) comprises a shutter body (7) which is movable with respect to the valve body (2) between:

a valve closing position, wherein said shutter body (7) abuts against a first abutment portion (8) of the valve body (2), and at least one valve opening position, wherein said shutter body (7), moved away from said first abutment portion (8) of the valve body (2), delimits with said valve body (2) at least one main fluid passage (9) which laps on said shutter body (7);

and wherein, when said shutter body (7) is in the valve closing position, it interrupts said at least one main fluid passage (9) and defines a master cylinder side pipe stretch (10) facing said master cylinder side opening (3) and a caliper side pipe stretch (11) facing said caliper side opening (4) in said valve pipe (5);

and wherein said shutter body (7) at least partially delimits at least one secondary fluid passage (12), so that, when said shutter body (7) is in valve closing position, said caliper side pipe stretch (11) is in fluid communication with said master cylinder side pipe stretch (10) only through said secondary fluid passage (12);

and wherein said at least one secondary fluid passage (12) is a through hole made in said shutter body (7);

wherein said shutter element (6) comprises at least one elastic device (26) which biases said shutter body (7) away from said first abutment portion (8) of the valve body (2).

2. The valve assembly (1) according to claim 1, wherein said shutter body (7) and said valve body (2) jointly delimit said secondary fluid passage (12); and/or wherein said secondary fluid passage (12) is delimited by at least one groove made on said shutter body (7) and by the walls of said valve body (2) facing said valve pipe (5).

3. The valve assembly (1) according to claim 1, wherein said secondary fluid passage (12) is a portion of said main fluid passage (9); and/or wherein said secondary fluid passage (12) is a subset of said main fluid passage (9).

4. The valve assembly (1) according to claim 1, wherein said at least one secondary fluid passage (12) comprises a first secondary passage mouth (29), which leads into said master cylinder side pipe stretch (10), and an opposite second secondary passage mouth (30), which leads into said caliper side pipe stretch (11); and/or wherein said secondary fluid passage (12) has a first secondary passage mouth (29) which leads onto a master cylinder side surface (13) of the shutter body (7), facing said master cylinder side opening (3), and an opposite second secondary passage mouth (30), which leads onto a caliper side surface (15) of said shutter body (7), opposite to said master cylinder side surface (13).

5. The valve assembly (1) according to claim 1, wherein said secondary fluid passage (12) puts said master cylinder side opening (3) and said caliper side opening (4) into fluid communication also when said shutter body (7) is in opening position.

6. The valve assembly (1) according to claim 1, wherein said valve pipe (5) comprises at least one shutter pipe stretch (25) delimited at least by said shutter body (7).

7. The valve assembly (1) according to claim 6, wherein said abutment portion (8) of the valve body (2) is made in one piece separate from said valve body (2); and/or wherein said first abutment surface (14) is made on a portion of said abutment portion (8) of the valve body (2) placed undercut with respect to said master cylinder side opening (3); and/or wherein said shutter body (7) comprises a master cylinder side surface (13), facing said master cylinder side opening (3), wherein said master cylinder surface (13) abuts against a first abutment surface (14) of said first abutment portion (8) of the valve body (2).

8. The valve assembly (1) according to claim 1, wherein said first abutment portion (8) and a second abutment portion (22) delimit a shutter housing chamber (23), adapted to limit the stroke of said shutter body (7), in said valve pipe (5); and/or wherein the walls of said valve body (2) facing said master cylinder side pipe stretch (10) are threaded; and/or wherein said abutment portion (8) of the valve body (2) is made on a threaded member which engages the threaded walls of the valve body (2) facing said master cylinder side pipe stretch (10), so as to allow the adjustment of the stroke of the shutter body (7); and/or wherein said caliper side pipe stretch (11) comprises a plurality of drawing branches (27) separated by at least one partition (28).

9. The valve assembly (1) according to claim 1, wherein said valve assembly (1) is electro-actuated.

10. The valve assembly (1) according to claim 9, wherein said shutter body (7) comprises at least one permanent magnet member (101) and said valve body (2) a coil member capable of electro-magnetically facing said permanent magnet element (101) to bias at least said shutter body (7) during closing.

11. The valve assembly (1) according to claim 1, wherein said valve body (2) is made in one piece with the caliper body (32) of a brake caliper which can be associated with said valve assembly (1).

12. A caliper body (32) of a brake caliper for a braking system of a vehicle, comprising at least one valve assembly (1) according to claim 1.

13. The caliper body (32) according to claim 12, wherein said caliper body (32) at least partially delimits said master cylinder side opening (3), said at least one caliper side opening (4), and said at least one valve pipe (5) which puts said master cylinder side opening (3) and said caliper side opening (4) into fluid communication, so that said caliper body (32) defines said valve body (2) of the valve assembly (1) in one piece.

14. The caliper body (32) according to claim 1, wherein said shutter pipe stretch (25) leads into said caliper side pipe stretch (11); and/or wherein said main fluid passage (9) comprises said shutter pipe stretch (25); and/or wherein when said shutter body (7) is in valve closing position, said master cylinder side pipe stretch (10) is in fluid communication with a portion of said shutter pipe stretch (25) through an orifice (24), so that said secondary fluid passage (12) can be accessed by means of said orifice (24); and/or wherein the longitudinal development axis of said master cylinder side pipe stretch (10) is either staggered or misaligned with respect to the longitudinal development axis of said caliper side pipe stretch (11).

15. The caliper body (32) according to claim 1, wherein said shutter pipe stretch (25) is formed by at least one through hole made in said shutter body (7), thus avoiding to have a further valve adapted to close said shutter pipe stretch (25) selectively; and/or wherein said master cylinder side pipe stretch (10), said shutter pipe stretch (25) and said caliper side stretch (11) are substantially and mutually aligned defining a substantially rectilinear flow direction which joins said master cylinder side opening (3) and said caliper side opening (4); and/or wherein said master cylinder side opening (3) is substantially coaxial with said caliper side opening (4); and/or wherein said master cylinder side pipe stretch (10), said shutter pipe stretch (25) and said caliper side pipe stretch (11) are substantially and mutually coaxial.

16. The valve assembly according to claim 1, wherein a cross section of said master cylinder side pipe stretch (10) is either greater than or equal to a cross section of a caliper side pipe stretch, and/or wherein said shutter body (7) comprises a master cylinder side surface, facing said master cylinder side opening, and a caliper side surface opposite to said master cylinder side surface, wherein said elastic device (26) is interposed between said master cylinder side surface and a portion of the valve body (2) to bias said shutter body away from the first abutment portion (8) of the valve body (2).

17. The valve assembly according to claim 15, wherein said shutter body (7) is T-shaped.

* * * * *